United States Patent
Bullotta et al.

(10) Patent No.: US 9,578,082 B2
(45) Date of Patent: *Feb. 21, 2017

(54) METHODS FOR DYNAMICALLY GENERATING AN APPLICATION INTERFACE FOR A MODELED ENTITY AND DEVICES THEREOF

(71) Applicant: PTC Inc., Needham, MA (US)

(72) Inventors: Rick Bullotta, Phoenixville, PA (US); John Schaefer, Ambler, PA (US)

(73) Assignee: PTC Inc., Needham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/751,379

(22) Filed: Jun. 26, 2015

(65) Prior Publication Data

US 2015/0334161 A1    Nov. 19, 2015

Related U.S. Application Data

(63) Continuation of application No. 13/678,885, filed on Nov. 16, 2012, now Pat. No. 9,098,312.

(Continued)

(51) Int. Cl.
*G06F 15/16* (2006.01)
*H04L 29/08* (2006.01)
*G06F 9/44* (2006.01)

(52) U.S. Cl.
CPC ............. *H04L 67/02* (2013.01); *G06F 9/4443* (2013.01); *H04L 67/16* (2013.01); *H04L 67/28* (2013.01); *G06F 8/30* (2013.01)

(58) Field of Classification Search
CPC ................................ H04L 67/32; H04L 67/28
(Continued)

(56) References Cited

U.S. PATENT DOCUMENTS 3,656,112 A    4/1972 Paull
3,916,412 A    10/1975 Amoroso, Jr.
(Continued)

FOREIGN PATENT DOCUMENTS

EP    0497010 A2    8/1992
EP    1187015 A2    3/2002
(Continued)

OTHER PUBLICATIONS

Hart Server, retrieved from 2001 internet archive of hartcomm.org http://www.hartcomm.org/server2/index.html, 13 pages (2001).
(Continued)

*Primary Examiner* — Adnan Mirza
(74) *Attorney, Agent, or Firm* — Meunier Carlin & Curfman LLC

(57) ABSTRACT

This technology generates a plurality of instances of things each including a dynamically generated interface structure and services associated with and properties of the corresponding one of the things. The services associated with and the properties of one of the plurality of instances of things for a selected one of the plurality of instances of things are retrieved and provided. A service definition for a selected one of the services is retrieved and provided based on the retrieved and provided services associated with and properties for the selected one of the plurality of instances of things. A requested consumption call for the selected one of the services is executed based on the retrieved service definition. A defined result set for the executed consumption call is provided in the dynamically generated interface structure associated with the requested one of the plurality of instances of things.

12 Claims, 4 Drawing Sheets

Related U.S. Application Data

(60) Provisional application No. 61/560,371, filed on Nov. 16, 2011.

(58) Field of Classification Search
USPC .................................... 709/203, 204, 223
See application file for complete search history.

(56) References Cited

U.S. PATENT DOCUMENTS

| | | |
|---|---|---|
| 3,983,484 A | 9/1976 | Hodama |
| 4,063,173 A | 12/1977 | Nelson et al. |
| 4,103,250 A | 7/1978 | Jackson |
| 4,134,068 A | 1/1979 | Richardson |
| 4,216,546 A | 8/1980 | Litt |
| 4,554,668 A | 11/1985 | Deman et al. |
| 4,601,059 A | 7/1986 | Gammenthaler |
| 4,680,582 A | 7/1987 | Mejia |
| 4,704,585 A | 11/1987 | Lind |
| 4,887,204 A | 12/1989 | Johnson et al. |
| 4,979,170 A | 12/1990 | Gilhousen et al. |
| 5,113,416 A | 5/1992 | Lindell |
| 5,134,615 A | 7/1992 | Freeburg et al. |
| 5,159,704 A | 10/1992 | Pirolli et al. |
| 5,276,703 A | 1/1994 | Budin et al. |
| 5,361,401 A | 11/1994 | Pirillo |
| 5,422,889 A | 6/1995 | Sevenhans et al. |
| 5,454,010 A | 9/1995 | Leveque |
| 5,479,441 A | 12/1995 | Tymes et al. |
| 5,493,671 A | 2/1996 | Pitt et al. |
| 5,515,365 A | 5/1996 | Sumner et al. |
| 5,734,966 A | 3/1998 | Farrer et al. |
| 5,737,609 A | 4/1998 | Reed et al. |
| 5,805,442 A | 9/1998 | Crater et al. |
| 5,892,962 A | 4/1999 | Cloutier |
| 5,909,640 A | 6/1999 | Farrer et al. |
| 5,925,100 A | 7/1999 | Drewry et al. |
| 6,169,992 B1 | 1/2001 | Beall et al. |
| 6,182,252 B1 | 1/2001 | Wong et al. |
| 6,198,480 B1 | 3/2001 | Cotugno et al. |
| 6,377,162 B1 | 4/2002 | Delestienne et al. |
| 6,430,602 B1 | 8/2002 | Kay et al. |
| 6,473,788 B1 | 10/2002 | Kim et al. |
| 6,510,350 B1 | 1/2003 | Steen, III et al. |
| 6,553,405 B1 | 4/2003 | Desrochers |
| 6,570,867 B1 | 5/2003 | Robinson et al. |
| 6,618,709 B1 | 9/2003 | Sneeringer |
| 6,675,193 B1 | 1/2004 | Slavin et al. |
| 6,757,714 B1 | 6/2004 | Hansen |
| 6,766,361 B1 | 7/2004 | Venigalla |
| 6,797,921 B1 | 9/2004 | Niedereder et al. |
| 6,810,522 B2 | 10/2004 | Cook et al. |
| 6,813,587 B2 | 11/2004 | McIntyre et al. |
| 6,850,255 B2 | 2/2005 | Muschetto |
| 6,859,757 B2 | 2/2005 | Muehl et al. |
| 6,915,330 B2 | 7/2005 | Hardy et al. |
| 6,980,558 B2 | 12/2005 | Aramoto |
| 6,993,555 B2 | 1/2006 | Kay et al. |
| 7,031,520 B2 | 4/2006 | Tunney |
| 7,046,134 B2 | 5/2006 | Hansen |
| 7,047,159 B2 | 5/2006 | Muehl et al. |
| 7,054,922 B2 | 5/2006 | Kinney et al. |
| 7,082,383 B2 | 7/2006 | Baust et al. |
| 7,082,460 B2 | 7/2006 | Hansen et al. |
| 7,117,239 B1 | 10/2006 | Hansen |
| 7,149,792 B1 | 12/2006 | Hansen et al. |
| 7,178,149 B2 | 2/2007 | Hansen |
| 7,185,014 B1 | 2/2007 | Hansen |
| 7,250,862 B2 | 7/2007 | Bornhoevd et al. |
| 7,254,601 B2 | 8/2007 | Baller et al. |
| 7,269,732 B2 | 9/2007 | Kilian-Kehr |
| 7,341,197 B2 | 3/2008 | Muehl et al. |
| 7,380,236 B2 | 5/2008 | Hawley |
| 7,496,911 B2 | 2/2009 | Rowley et al. |
| 7,529,570 B2 | 5/2009 | Shirota |
| 7,529,750 B2 | 5/2009 | Bair |
| 7,536,673 B2 | 5/2009 | Brendle et al. |
| 7,555,355 B2 | 6/2009 | Meyer |
| 7,566,005 B2 | 7/2009 | Heusermann et al. |
| 7,570,755 B2 | 8/2009 | Williams et al. |
| 7,587,251 B2 | 9/2009 | Hopsecger |
| 7,591,006 B2 | 9/2009 | Werner |
| 7,593,917 B2 | 9/2009 | Werner |
| 7,613,290 B2 | 11/2009 | Williams et al. |
| 7,616,642 B2 | 11/2009 | Anke et al. |
| 7,617,198 B2 | 11/2009 | Durvasula |
| 7,624,092 B2 | 11/2009 | Lieske et al. |
| 7,624,371 B2 | 11/2009 | Kulkarni et al. |
| 7,644,120 B2 | 1/2010 | Todorov et al. |
| 7,644,129 B2 | 1/2010 | Videlov |
| 7,647,407 B2 | 1/2010 | Omshehe et al. |
| 7,650,607 B2 | 1/2010 | Resnick et al. |
| 7,653,902 B2 | 1/2010 | Bozak et al. |
| 7,673,141 B2 | 3/2010 | Kilian-Kehr et al. |
| 7,684,621 B2 | 3/2010 | Tunney |
| 7,703,024 B2 | 4/2010 | Kautzleben et al. |
| 7,707,550 B2 | 4/2010 | Resnick et al. |
| 7,725,815 B2 | 5/2010 | Peters |
| 7,728,838 B2 | 6/2010 | Forney et al. |
| 7,730,498 B2 | 6/2010 | Resnick et al. |
| 7,743,015 B2 | 6/2010 | Schmitt |
| 7,743,155 B2 | 6/2010 | Pisharody et al. |
| 7,752,335 B2 | 7/2010 | Boxenhorn |
| 7,757,234 B2 | 7/2010 | Krebs |
| 7,761,354 B2 | 7/2010 | Kling et al. |
| 7,774,369 B2 | 8/2010 | Herzog et al. |
| 7,779,089 B2 | 8/2010 | Hessmer et al. |
| 7,779,383 B2 | 8/2010 | Bornhoevd et al. |
| 7,783,984 B2 | 8/2010 | Roediger et al. |
| 7,802,238 B2 | 9/2010 | Clinton |
| 7,814,044 B2 | 10/2010 | Schwerk |
| 7,814,208 B2 | 10/2010 | Stephenson et al. |
| 7,817,039 B2 | 10/2010 | Bornhoevd et al. |
| 7,827,169 B2 | 11/2010 | Enenkiel |
| 7,831,600 B2 | 11/2010 | Kilian |
| 7,840,701 B2 | 11/2010 | Hsu et al. |
| 7,852,861 B2 | 12/2010 | Wu et al. |
| 7,853,241 B1 | 12/2010 | Harrison |
| 7,853,924 B2 | 12/2010 | Curran |
| 7,860,968 B2 | 12/2010 | Bornhoevd et al. |
| 7,865,442 B1 | 1/2011 | Sowell |
| 7,865,731 B2 | 1/2011 | Kilian-Kehr |
| 7,865,939 B2 | 1/2011 | Schuster |
| 7,873,666 B2 | 1/2011 | Sauermann |
| 7,882,148 B2 | 2/2011 | Werner et al. |
| 7,886,278 B2 | 2/2011 | Stulski |
| 7,890,388 B2 | 2/2011 | Mariotti |
| 7,890,568 B2 | 2/2011 | Belenki |
| 7,895,115 B2 | 2/2011 | Bayyapu et al. |
| 7,899,777 B2 | 3/2011 | Baier et al. |
| 7,899,803 B2 | 3/2011 | Cotter et al. |
| 7,908,278 B2 | 3/2011 | Akkiraju et al. |
| 7,917,629 B2 | 3/2011 | Werner |
| 7,921,137 B2 | 4/2011 | Lieske et al. |
| 7,921,686 B2 | 4/2011 | Bagepalli et al. |
| 7,925,979 B2 | 4/2011 | Forney et al. |
| 7,937,370 B2 | 5/2011 | Hansen |
| 7,937,408 B2 | 5/2011 | Stuhec |
| 7,945,691 B2 | 5/2011 | Dharamshi |
| 7,953,219 B2 | 5/2011 | Freedman et al. |
| 7,954,107 B2 | 5/2011 | Mao et al. |
| 7,954,115 B2 | 5/2011 | Gisolfi |
| 7,966,418 B2 | 6/2011 | Shedrinsky |
| 7,975,024 B2 | 7/2011 | Nudler |
| 7,987,176 B2 | 7/2011 | Latzina et al. |
| 7,987,193 B2 | 7/2011 | Ganapam et al. |
| 7,992,200 B2 | 8/2011 | Kuehr-McLaren et al. |
| 8,000,991 B2 | 8/2011 | Montagut |
| 8,005,879 B2 | 8/2011 | Bornhoevd et al. |
| 8,024,218 B2 | 9/2011 | Kumar et al. |
| 8,024,743 B2 | 9/2011 | Werner |
| 8,051,045 B2 | 11/2011 | Vogler |
| 8,055,758 B2 | 11/2011 | Hansen |
| 8,055,787 B2 | 11/2011 | Victor et al. |
| 8,060,886 B2 | 11/2011 | Hansen |

(56) References Cited

U.S. PATENT DOCUMENTS

| | | |
|---|---|---|
| 8,065,397 B2 | 11/2011 | Taylor et al. |
| 8,069,362 B2 | 11/2011 | Gebhart et al. |
| 8,073,331 B1 | 12/2011 | Mazed |
| 8,074,215 B2 | 12/2011 | Cohen et al. |
| 8,081,584 B2 | 12/2011 | Thibault et al. |
| 8,082,322 B1 | 12/2011 | Pascarella et al. |
| 8,090,452 B2 | 1/2012 | Johnson et al. |
| 8,090,552 B2 | 1/2012 | Henry et al. |
| 8,095,632 B2 | 1/2012 | Hessmer et al. |
| 8,108,543 B2 | 1/2012 | Hansen |
| 8,126,903 B2 | 2/2012 | Lehmann et al. |
| 8,127,237 B2 | 2/2012 | Beringer |
| 8,131,694 B2 | 3/2012 | Bender et al. |
| 8,131,838 B2 | 3/2012 | Bornhoevd et al. |
| 8,136,034 B2 | 3/2012 | Stanton et al. |
| 8,145,468 B2 | 3/2012 | Fritzsche et al. |
| 8,145,681 B2 | 3/2012 | Macaleer et al. |
| 8,151,257 B2 | 4/2012 | Zachmann |
| 8,156,117 B2 | 4/2012 | Krylov et al. |
| 8,156,208 B2 | 4/2012 | Bornhoevd et al. |
| 8,156,473 B2 | 4/2012 | Heidasch |
| 8,183,995 B2 | 5/2012 | Wang et al. |
| 8,190,708 B1 | 5/2012 | Short et al. |
| 8,229,944 B2 | 7/2012 | Latzina et al. |
| 8,230,333 B2 | 7/2012 | Decherd et al. |
| 8,249,906 B2 | 8/2012 | Ponce de Leon |
| 8,250,169 B2 | 8/2012 | Beringer et al. |
| 8,254,249 B2 | 8/2012 | Wen et al. |
| 8,261,193 B1 | 9/2012 | Alur et al. |
| 8,271,935 B2 | 9/2012 | Lewis |
| 8,280,009 B2 | 10/2012 | Stepanian |
| 8,284,033 B2 | 10/2012 | Moran |
| 8,285,807 B2 | 10/2012 | Slavin et al. |
| 8,291,039 B2 | 10/2012 | Shedrinsky |
| 8,291,475 B2 | 10/2012 | Jackson et al. |
| 8,296,198 B2 | 10/2012 | Bhatt et al. |
| 8,296,266 B2 | 10/2012 | Lehmann et al. |
| 8,296,413 B2 | 10/2012 | Bornhoevd et al. |
| 8,301,770 B2 | 10/2012 | van Coppenolle et al. |
| 8,306,635 B2 | 11/2012 | Pryor |
| 8,312,383 B2 | 11/2012 | Gilfix |
| 8,321,790 B2 | 11/2012 | Sherrill et al. |
| 8,321,792 B1 | 11/2012 | Alur et al. |
| 8,331,855 B2 | 12/2012 | Williams et al. |
| 8,346,520 B2 | 1/2013 | Lu et al. |
| 8,359,116 B2 | 1/2013 | Manthey |
| 8,364,300 B2 | 1/2013 | Pouyez et al. |
| 8,370,479 B2 | 2/2013 | Hart et al. |
| 8,370,826 B2 | 2/2013 | Johnson et al. |
| 8,375,292 B2 | 2/2013 | Coffman et al. |
| 8,375,362 B1 | 2/2013 | Brette et al. |
| RE44,110 E | 3/2013 | Venigalla |
| 8,392,116 B2 | 3/2013 | Lehmann et al. |
| 8,392,561 B1 | 3/2013 | Dyer et al. |
| 8,396,929 B2 | 3/2013 | Helfman et al. |
| 8,397,056 B1 | 3/2013 | Malks et al. |
| 8,406,119 B2 | 3/2013 | Taylor et al. |
| 8,412,579 B2 | 4/2013 | Gonzalez |
| 8,417,764 B2 | 4/2013 | Fletcher et al. |
| 8,417,854 B2 | 4/2013 | Weng et al. |
| 8,423,418 B2 | 4/2013 | Hald et al. |
| 8,424,058 B2 | 4/2013 | Vinogradov et al. |
| 8,433,664 B2 | 4/2013 | Ziegler et al. |
| 8,433,815 B2 | 4/2013 | van Coppenolle et al. |
| 8,438,132 B1 | 5/2013 | Dziuk et al. |
| 8,442,933 B2 | 5/2013 | Baier et al. |
| 8,442,999 B2 | 5/2013 | Gorelik et al. |
| 8,443,069 B2 | 5/2013 | Bagepalli et al. |
| 8,443,071 B2 | 5/2013 | Lu et al. |
| 8,457,996 B2 | 6/2013 | Winkler et al. |
| 8,458,189 B1 | 6/2013 | Ludwig et al. |
| 8,458,315 B2 | 6/2013 | Miche et al. |
| 8,458,596 B1 | 6/2013 | Malks et al. |
| 8,458,600 B2 | 6/2013 | Dheap et al. |
| 8,473,317 B2 | 6/2013 | Santoso et al. |
| 8,478,861 B2 | 7/2013 | Taylor et al. |
| 8,484,156 B2 | 7/2013 | Hancsarik et al. |
| 8,489,527 B2 | 7/2013 | van Coppenolle et al. |
| 8,490,047 B2 | 7/2013 | Petschnigg et al. |
| 8,490,876 B2 | 7/2013 | Tan et al. |
| 8,495,072 B1 | 7/2013 | Kapoor et al. |
| 8,495,511 B2 | 7/2013 | Redpath |
| 8,495,683 B2 | 7/2013 | van Coppenolle et al. |
| 8,516,296 B2 | 8/2013 | Mendu |
| 8,516,383 B2 | 8/2013 | Bryant et al. |
| 8,521,621 B1 | 8/2013 | Hetzer et al. |
| 8,522,217 B2 | 8/2013 | Dutta et al. |
| 8,522,341 B2 | 8/2013 | Nochta et al. |
| 8,532,008 B2 | 9/2013 | Das et al. |
| 8,533,660 B2 | 9/2013 | Mehr et al. |
| 8,538,799 B2 | 9/2013 | Haller et al. |
| 8,543,568 B2 | 9/2013 | Wagenblatt |
| 8,547,838 B2 | 10/2013 | Lee et al. |
| 8,549,157 B2 | 10/2013 | Schnellbaecher |
| 8,555,248 B2 | 10/2013 | Brunswig et al. |
| 8,560,636 B2 | 10/2013 | Kieselbach |
| 8,560,713 B2 | 10/2013 | Moreira Sa de Souza et al. |
| 8,566,193 B2 | 10/2013 | Singh et al. |
| 8,571,908 B2 | 10/2013 | Li et al. |
| 8,572,107 B2 | 10/2013 | Fan et al. |
| 8,577,904 B2 | 11/2013 | Marston |
| 8,578,059 B2 | 11/2013 | Odayappan et al. |
| 8,578,328 B2 | 11/2013 | Kamiyama et al. |
| 8,578,330 B2 | 11/2013 | Dreiling et al. |
| 8,584,082 B2 | 11/2013 | Baird et al. |
| 8,588,765 B1 | 11/2013 | Harrison |
| 8,594,023 B2 | 11/2013 | He et al. |
| 8,635,254 B2 | 1/2014 | Harvey et al. |
| 8,689,181 B2 | 4/2014 | Biron, III |
| 8,752,074 B2 | 6/2014 | Hansen |
| 8,762,497 B2 | 6/2014 | Hansen |
| 8,769,095 B2 | 7/2014 | Hart et al. |
| 8,788,632 B2 | 7/2014 | Taylor et al. |
| 8,898,294 B2 | 11/2014 | Hansen |
| 9,002,980 B2 | 4/2015 | Shedrinsky |
| 9,098,312 B2 | 8/2015 | Bullotta et al. |
| 2002/0099454 A1 | 7/2002 | Gerrity |
| 2002/0138596 A1 | 9/2002 | Darwin et al. |
| 2003/0093710 A1 | 5/2003 | Hashimoto et al. |
| 2003/0117280 A1 | 6/2003 | Prehn |
| 2004/0027376 A1 | 2/2004 | Calder et al. |
| 2004/0133635 A1 | 7/2004 | Spriestersbach et al. |
| 2004/0158455 A1 | 8/2004 | Spivack et al. |
| 2004/0158629 A1 | 8/2004 | Herbeck et al. |
| 2004/0177124 A1 | 9/2004 | Hansen |
| 2005/0015369 A1 | 1/2005 | Styles et al. |
| 2005/0021506 A1 | 1/2005 | Sauermann et al. |
| 2005/0027675 A1 | 2/2005 | Schmitt et al. |
| 2005/0060186 A1 | 3/2005 | Blowers et al. |
| 2005/0102362 A1 | 5/2005 | Price et al. |
| 2005/0198137 A1 | 9/2005 | Pavlik et al. |
| 2005/0213563 A1 | 9/2005 | Shaffer et al. |
| 2005/0240427 A1 | 10/2005 | Crichlow |
| 2005/0289154 A1 | 12/2005 | Weiss et al. |
| 2006/0186986 A1 | 8/2006 | Ma et al. |
| 2006/0208871 A1 | 9/2006 | Hansen |
| 2007/0005736 A1 | 1/2007 | Hansen et al. |
| 2007/0016557 A1 | 1/2007 | Moore et al. |
| 2007/0027854 A1 | 2/2007 | Rao et al. |
| 2007/0027914 A1 | 2/2007 | Agiwal |
| 2007/0162486 A1 | 7/2007 | Brueggemann et al. |
| 2007/0174158 A1 | 7/2007 | Bredehoeft et al. |
| 2007/0260593 A1 | 11/2007 | Delvat |
| 2007/0266384 A1 | 11/2007 | Labrou et al. |
| 2007/0300172 A1 | 12/2007 | Runge et al. |
| 2008/0098085 A1 | 4/2008 | Krane et al. |
| 2008/0172632 A1 | 7/2008 | Stambaugh |
| 2008/0208890 A1 | 8/2008 | Milam |
| 2008/0222599 A1 | 9/2008 | Nathan et al. |
| 2008/0231414 A1 | 9/2008 | Canosa |
| 2008/0244077 A1 | 10/2008 | Canosa |
| 2008/0244594 A1 | 10/2008 | Chen et al. |
| 2008/0255782 A1 | 10/2008 | Bilac et al. |
| 2008/0319947 A1 | 12/2008 | Latzina et al. |

(56) References Cited

U.S. PATENT DOCUMENTS

| | | |
|---|---|---|
| 2009/0006391 A1 | 1/2009 | Ram |
| 2009/0150431 A1 | 6/2009 | Schmidt et al. |
| 2009/0193148 A1 | 7/2009 | Jung et al. |
| 2009/0259442 A1 | 10/2009 | Gandikota et al. |
| 2009/0265760 A1 | 10/2009 | Zhu et al. |
| 2009/0299990 A1 | 12/2009 | Setlur et al. |
| 2009/0300060 A1 | 12/2009 | Beringer et al. |
| 2009/0319518 A1 | 12/2009 | Koudas et al. |
| 2009/0327337 A1 | 12/2009 | Lee et al. |
| 2010/0017379 A1 | 1/2010 | Naibo et al. |
| 2010/0017419 A1 | 1/2010 | Francis et al. |
| 2010/0064277 A1 | 3/2010 | Baird et al. |
| 2010/0077001 A1 | 3/2010 | Vogel et al. |
| 2010/0094843 A1 | 4/2010 | Cras |
| 2010/0125584 A1 | 5/2010 | Navas |
| 2010/0125826 A1 | 5/2010 | Rice et al. |
| 2010/0250440 A1 | 9/2010 | Wang et al. |
| 2010/0257242 A1 | 10/2010 | Morris |
| 2010/0286937 A1 | 11/2010 | Hedley et al. |
| 2010/0287075 A1 | 11/2010 | Herzog et al. |
| 2010/0293360 A1 | 11/2010 | Schoop et al. |
| 2011/0078599 A1 | 3/2011 | Guertler et al. |
| 2011/0078600 A1 | 3/2011 | Guertler et al. |
| 2011/0099190 A1 | 4/2011 | Kreibe |
| 2011/0137883 A1 | 6/2011 | Lagad et al. |
| 2011/0138354 A1 | 6/2011 | Hertenstein et al. |
| 2011/0145712 A1 | 6/2011 | Pontier et al. |
| 2011/0145933 A1 | 6/2011 | Gambhir et al. |
| 2011/0153505 A1 | 6/2011 | Brunswig et al. |
| 2011/0154226 A1 | 6/2011 | Guertler et al. |
| 2011/0161409 A1 | 6/2011 | Nair et al. |
| 2011/0173203 A1 | 7/2011 | Jung et al. |
| 2011/0173220 A1 | 7/2011 | Jung et al. |
| 2011/0173264 A1 | 7/2011 | Kelly |
| 2011/0208788 A1 | 8/2011 | Heller et al. |
| 2011/0209069 A1 | 8/2011 | Mohler |
| 2011/0219327 A1 | 9/2011 | Middleton, Jr. et al. |
| 2011/0231592 A1 | 9/2011 | Bleier et al. |
| 2011/0276360 A1 | 11/2011 | Barth et al. |
| 2011/0307295 A1 | 12/2011 | Steiert et al. |
| 2011/0307363 A1 | 12/2011 | N et al. |
| 2011/0307405 A1 | 12/2011 | Hammer et al. |
| 2011/0320525 A1 | 12/2011 | Agarwal et al. |
| 2012/0005577 A1 | 1/2012 | Chakra et al. |
| 2012/0059856 A1 | 3/2012 | Kreibe et al. |
| 2012/0072435 A1 | 3/2012 | Han |
| 2012/0072885 A1 | 3/2012 | Taragin et al. |
| 2012/0078959 A1 | 3/2012 | Cho et al. |
| 2012/0096429 A1 | 4/2012 | Desai et al. |
| 2012/0131473 A1 | 5/2012 | Biron, III |
| 2012/0136649 A1 | 5/2012 | Freising et al. |
| 2012/0143970 A1 | 6/2012 | Hansen |
| 2012/0144370 A1 | 6/2012 | Kemmler et al. |
| 2012/0150859 A1 | 6/2012 | Hu |
| 2012/0158914 A1 | 6/2012 | Hansen |
| 2012/0166319 A1 | 6/2012 | Deledda et al. |
| 2012/0167006 A1 | 6/2012 | Tillert et al. |
| 2012/0173671 A1 | 7/2012 | Callaghan et al. |
| 2012/0197488 A1 | 8/2012 | Lee et al. |
| 2012/0197852 A1 | 8/2012 | Dutta et al. |
| 2012/0197856 A1 | 8/2012 | Banka et al. |
| 2012/0197898 A1 | 8/2012 | Pandey et al. |
| 2012/0197911 A1 | 8/2012 | Banka et al. |
| 2012/0239381 A1 | 9/2012 | Heidasch |
| 2012/0239606 A1 | 9/2012 | Heidasch |
| 2012/0254825 A1 | 10/2012 | Sharma et al. |
| 2012/0259932 A1 | 10/2012 | Kang et al. |
| 2012/0284259 A1 | 11/2012 | Jehuda |
| 2012/0311501 A1 | 12/2012 | Nonez et al. |
| 2012/0311526 A1 | 12/2012 | DeAnna et al. |
| 2012/0311547 A1 | 12/2012 | DeAnna et al. |
| 2012/0324066 A1 | 12/2012 | Alam et al. |
| 2013/0006400 A1 | 1/2013 | Caceres et al. |
| 2013/0036137 A1 | 2/2013 | Ollis et al. |
| 2013/0054563 A1 | 2/2013 | Heidasch |
| 2013/0060791 A1 | 3/2013 | Szalwinski et al. |
| 2013/0067031 A1 | 3/2013 | Shedrinsky |
| 2013/0067302 A1 | 3/2013 | Chen et al. |
| 2013/0073969 A1 | 3/2013 | Blank et al. |
| 2013/0080898 A1 | 3/2013 | Lavian et al. |
| 2013/0110496 A1 | 5/2013 | Heidasch |
| 2013/0110861 A1 | 5/2013 | Roy et al. |
| 2013/0124505 A1 | 5/2013 | Bullotta et al. |
| 2013/0124616 A1 | 5/2013 | Bullotta et al. |
| 2013/0125053 A1 | 5/2013 | Brunswig et al. |
| 2013/0132385 A1 | 5/2013 | Bullotta et al. |
| 2013/0166563 A1 | 6/2013 | Mueller et al. |
| 2013/0166569 A1 | 6/2013 | Navas |
| 2013/0173062 A1 | 7/2013 | Koenig-Richardson |
| 2013/0179565 A1 | 7/2013 | Hart et al. |
| 2013/0185593 A1 | 7/2013 | Taylor et al. |
| 2013/0185786 A1 | 7/2013 | Dyer et al. |
| 2013/0191767 A1 | 7/2013 | Peters et al. |
| 2013/0207980 A1 | 8/2013 | Ankisettipalli et al. |
| 2013/0211555 A1 | 8/2013 | Lawson et al. |
| 2013/0246897 A1 | 9/2013 | O'Donnell |
| 2013/0262641 A1 | 10/2013 | Zur et al. |
| 2013/0275344 A1 | 10/2013 | Heidasch |
| 2013/0275550 A1 | 10/2013 | Lee et al. |
| 2013/0304581 A1 | 11/2013 | Soroca et al. |
| 2014/0019432 A1 | 1/2014 | Lunenfeld |
| 2014/0282370 A1 | 9/2014 | Schaefer et al. |

FOREIGN PATENT DOCUMENTS

| | | |
|---|---|---|
| WO | WO-99/21152 A1 | 4/1999 |
| WO | WO-00/77592 A2 | 12/2000 |
| WO | WO-2008/115995 A1 | 9/2008 |
| WO | WO-2014/145084 A1 | 9/2014 |

OTHER PUBLICATIONS

Ray, Erik T., Learning XML, First Edition, 277 pages (2001).
Shi, L. et al., Understanding Text Corpora with Multiple Facets, IEEE Symposium on Visual Analytics Science and Technology (VAST), 99-106 (2010).

METHODS FOR DYNAMICALLY GENERATING AN APPLICATION INTERFACE FOR A MODELED ENTITY AND DEVICES THEREOF

RELATED APPLICATIONS

This application is a continuation of U.S. application Ser. No. 13/678,885, filed on Nov. 16, 2012, which claims the benefit of U.S. Provisional Patent Application No. 61/560,371, filed Nov. 16, 2011. The entire disclosures of these prior applications are incorporated by reference herein.

FIELD

This technology relates to methods for generating a dynamic representational state of a thing and devices thereof

BACKGROUND

The connected world, also referred to as the Internet of Things or IOT, is growing quickly. Analysts have estimated that along with the continued growth of humans using the Internet, the number of connected devices and systems will rise from 5 Billion to 1 Trillion in the next 10 years. However, the traditional ways to manage and communicate with these systems has not changed, meaning that all the information from these systems is not accessible or is not able to be correlated in a way that helps people or businesses do their jobs better and more efficiently, find information they are looking for in the proper context, or make this data consumable in a meaningful way. In addition, user expectations for interacting with systems have changed. Social networks and Mashup web pages have become the common way for users to consume data and interact with other people.

There are a variety of specific solutions to handle the rising amount of data found in industry today. They can be categorized into the following: Enterprise Resource Planning (ERP) systems; Portals and related technologies; Traditional Business Intelligence systems; and Manufacturing Intelligence systems.

Enterprise Resource Planning systems are used by large and small companies to run their businesses. The minimal requirement is to provide financial and accounting services. However, these systems typically have functionality for specific vertical industries, such as manufacturing, utilities, construction, retail, etc. These systems are rigid, in both business process support and data models. They are very expensive to implement and maintain. They are implemented to enforce repeatable, standard business processes. Traditionally it has been impossible to use these systems for dynamic business processes or interactive problem solving.

Portals are a way for companies to share information through a thin client (browser). Usually, a number of documents and data sources are used to publish information for a large user base. The information, while searchable, is relatively static and does not address current conditions or interactive problem solving.

Traditional business intelligence solutions usually rely on specific, detailed data models (often data warehouses). While the data is typically "fresh" (about a day old) in these systems, the models are rigid and report writing may require Information Technology (IT) skills. While these solutions have become much better at providing users with the ability to self-serve, the self service capability is restricted to previously designed semantic models. These solutions do not address current conditions, rapidly changing data, third party collaboration, or external data sources.

Manufacturing Intelligence solutions (also referred to as Enterprise Manufacturing Intelligence or EMI) are concerned with the more real-time data that is collected from machines and devices. This data is usually time series data and does not have business context associated with it. The consumers of these applications are usually plant operators and engineers. These applications do not handle other business related data, do not understand or correlate unstructured data, and are not "document" friendly.

The currently utilized solution to pull all these separate sources of data together, so that users can consume data from more than one of these solutions in a meaningful way, is to execute a complex, multi-year integration project that results in a data mart. This usually involves replicating large quantities of data from multiple systems into a rigid model, similar to a hub and spoke model. The hub is the data mart holding all the replicated data. As the systems change at the end of the spokes, new integration and modeling is required. This type of solution is expensive to maintain. The data model and semantics are not dynamic. And the ability to consume the data is available only through pre-defined reports.

Additionally, the traditional applications that rely on relational data bases are adept at answering known questions against known data structures (Known-Known). Search engines and related applications can answer known questions against unknown data structures (Known-Unknown). The problem at hand is how to handle the above scenarios, but also answer unknown questions against known data structures (Unknown-Known), and unknown questions against unknown data structures (Unknown-Unknown).

Most software applications allow a user or developer to manipulate data within the application. Accordingly, existing technologies have developed design tools to assist application software developer in designing an application interface.

Unfortunately, existing interface development technologies and designs have not kept pace with the increasing demand for interfaces. For example, the existing interface development technologies are not equipped to address current conditions, such as rapidly changing data sets which are accessible in different manners, at different locations and in different formats. Attempts with existing interface development technologies to provide self service capability have been limited to previously designed semantic models. Further, many of these design tools require specialized training to be able to use them to develop an application interface.

To meet these increased demands for interfaces, developers of these interfaces need all the required information for the application interface to be easily and readily available. Additionally, developers of these interfaces need to be able quickly obtain and understand all of the relationships that exist within the application. This technology's unique model-based design and development tools enable developers to build and deploy operational solutions in less time than traditional approaches.

SUMMARY

A method for generating a dynamic representational state of a thing includes generating by a data management computing apparatus a plurality of instances of things. Each of the instances of things comprises a dynamically generated interface structure and one or more services associated with and one or more properties of the corresponding one of the things. The one or more services associated with and the one or more properties of one of the plurality of instances of things for a selected one of the plurality of instances of things are retrieved and provided by the data management computing apparatus. A service definition for a selected one of the one or more services is retrieved and provided by the management computing apparatus based on the retrieved and provided one or more services associated with and one or more properties for the selected one of the plurality of instances of things. A requested consumption call for the selected one of the services is executed by the data management computing apparatus based on the retrieved service definition. A defined result set for the executed consumption call is provided by the data management computing apparatus in the dynamically generated interface structure associated with the requested one of the plurality of instances of things.

A non-transitory computer readable medium having stored thereon instructions for generating a dynamic representational state of a thing comprising machine executable code which when executed by at least one processor, causes the processor to perform steps including generating a plurality of instances of things. Each of the instances of things comprises a dynamically generated interface structure and one or more services associated with and one or more properties of the corresponding one of the things. The one or more services associated with and the one or more properties of one of the plurality of instances of things for a selected one of the plurality of instances of things are retrieved and provided. A service definition for a selected one of the one or more services is retrieved and provided based on the retrieved and provided one or more services associated with and one or more properties for the selected one of the plurality of instances of things. A requested consumption call for the selected one of the services is executed based on the retrieved service definition. A defined result set for the executed consumption call is provided in the dynamically generated interface structure associated with the requested one of the plurality of instances of things.

A data management computing apparatus comprising one or more processors, a memory coupled to the one or more processors which are configured to execute programmed instructions stored in the memory includes generating a plurality of instances of things. Each of the instances of things comprises a dynamically generated interface structure and one or more services associated with and one or more properties of the corresponding one of the things. The one or more services associated with and the one or more properties of one of the plurality of instances of things for a selected one of the plurality of instances of things are retrieved and provided. A service definition for a selected one of the one or more services is retrieved and provided based on the retrieved and provided one or more services associated with and one or more properties for the selected one of the plurality of instances of things. A requested consumption call for the selected one of the services is executed based on the retrieved service definition. A defined result set for the executed consumption call is provided in the dynamically generated interface structure associated with the requested one of the plurality of instances of things.

Accordingly, this technology provides a number of advantages including providing methods, non-transitory computer readable medium and apparatuses that more easily and effectively generate and provide through an interface a dynamic representational state of a thing. With this technology all of the interrelationships which exist in the dynamic representational state information are easily and readily available. Additionally, with this technology no specialized training is required.

DETAILED DESCRIPTION

Figure 1A:
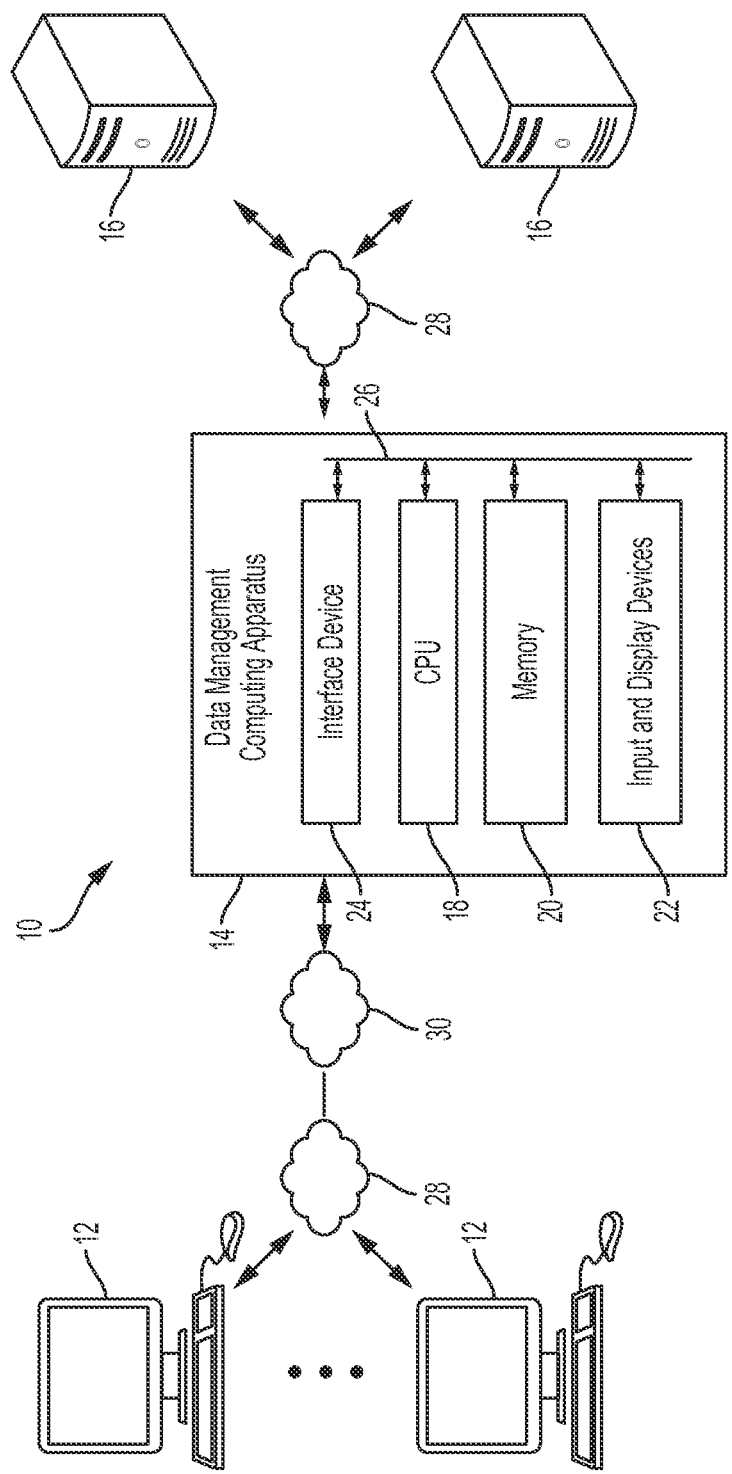
FIG. 1A is a diagram of an exemplary network environment which comprises a data management computing apparatus for generating and providing through an interface a dynamic representational state of a thing.

The platform described by this technology defines a model driven development architecture in which the model has entities, which typically represent physical assets/devices, computer applications and systems, and people. Entities can also represent data objects and platform services. Each entity has its own properties and services and can fire and consume events. All entities are treated as equal collaborators in any applications that utilize the underlying capabilities of the system. A data management computing apparatus provides a number of functions including dynamically generating application interfaces for accessing modeled data from one or more data servers, although other numbers and types of systems can be used and other numbers and types of functions can be performed.

A consumer computing device utilizes the dynamically generated interfaces provided by the data management computing apparatus to access modeled data and other information from one or more data servers. Each of the data servers enter, update and/or store content, such as files and directories, although other numbers and types of functions can be implemented and other types and amounts of data could be entered, updated, or stored used. The data servers may include by way of example only, Enterprise Resource Planning (ERP) systems; Portals and related technologies; Traditional Business Intelligence systems; and Manufacturing Intelligence systems.

A service is simple or complex function provided on the server, which is accessible via the application REST interface. A service has inputs, processing, and outputs.

An event is a simple or complex change of data and/or status of an entity. An event has a well defined complex data output that is sent to each event subscriber when the event is detected.

An Entity is any object in the model.

A Thing is typically an instance of a Thing Template. A Thing Template is itself an abstract class that can inherit from one or more Thing Shapes. Properties, services, and events can be defined at the Thing Shape, Thing Template or Thing instance. If a Thing Template inherits from one or more Thing Shapes, all the properties, events, and services of the Thing Shapes are part of the Thing Template. When a Thing instance is created from a Thing Template, all properties, events, and services of the Thing Template are realized within the Thing instance.

Data objects are represented as InfoTables and Streams. InfoTables and Streams are described and defined by DataShapes, which are reusable, abstract data object definitions. An Info Table can be similar to a relational database table, which represents a two dimensional data object (columns and rows). An InfoTable can also represent much more complex representations of data, because an column within an InfoTable can itself be an InfoTable, allowing ann-tier hierarchical data representation. A Stream is designed to capture time series data. Time series data is the data that is most often found as part of the communication flow for devices and machines. Streams and InfoTables also have services and events.

Within this system, developers model the Things (people, systems and real world equipment/devices) in their world, independent of any specific use case. Things are augmented projections of their real world equivalents containing the complete set of data, services, events, historical activities, collaboration, relationships and user interfaces that define it and its place in the world. These Things can then be easily combined into solutions, tagged and related into industrial social graphs, searched/queried/analyzed, and mashed up into new operational processes.

This technology enables applications that are "dynamic" in that they continuously evolve and grow over time. As the application runs, it continuously collects and indexes new data about the entities in the model, which allows more data to be mined and searched over time. This technology provides the basis for this evolution, allowing users to answer questions, solve problems, and capture opportunities that have not even been anticipated.

All entities can, based on authorizations, subscribe to any other entities events and can consume other entity services. When an entity is defined, it is immediately discoverable through a standard Representational State Transfer (REST) interface over HTTP or HTTPS. Therefore, the complete model namespace is available over a dynamic REST interface. Whatever a user defines the model to be appears as a REST interface. The REST interface for the model also includes a full description of the properties, services, and events for each entity. The REST interface for the namespace describes how to consume services for each entity in the model. As soon as a new Thing is defined in the model, the full set of services and data for the Thing is available as a set of REST interfaces.

The dynamic REST interface is based on an inheritance or object oriented model. If a new service, property, or capability is defined at the Thing Shape or Thing Template level, each Thing instance that is derived from those entities immediately inherits that service, property or capability.

Applications built on the platform described by the technology, such as Mashup web pages, can expose these new capabilities automatically, without any changes to the application definition.

Any third party application can consume and contribute to the applications created using the platform described by the technology through the open REST interfaces.

A person can consume and contribute to the application created using the platform described by the technology through the open REST interfaces by using any Internet browser, without any programming.

A machine or device can consume or contribute to this application through the open REST interfaces. For example, an instrument can write time series data to a Stream through a REST interface.

The model and the corresponding interfaces that are dynamically generated by the server platform created using the platform described by the technology, are configured without any programming or technical expertise, using the technology's modeling environment.

An exemplary environment 10 with a data management computing apparatus 14 that generates and provides through an interface a dynamic representational state of a thing is illustrated in FIG. 1A. In this particular example, the environment 10 includes a data management computing apparatus 14, a plurality of consumer computing device 12, and a plurality of data servers 16 which are coupled together by the Local Area Network (LAN) 28 and Wide Area Network (WAN) 30, although the environment 10 can include other types and numbers of devices, components, elements and communication networks in other topologies and deployments. While not shown, the exemplary environment 10 may include additional components, such as routers, switches and other devices which are well known to those of ordinary skill in the art and thus will not be described here. This technology provides a number of advantages including providing methods, non-transitory computer readable medium and apparatuses that more easily and effectively generate and provide through an interface a dynamic representational state of a thing.

Referring more specifically to FIG. 1A, the data management computing apparatus 14 provides a number of functions including generating a dynamic representational state of a thing, although other numbers and types of systems can be used and other numbers and types of functions can be performed. The data management computing apparatus 14 includes at least one processor 18, memory 20, input and display devices 22, and interface device 24 which are coupled together by bus 26, although data management computing apparatus 14 may comprise other types and numbers of elements in other configurations.

Processor(s) 18 may execute one or more computer-executable instructions stored in the memory 20 for the methods illustrated and described with reference to the examples herein, although the processor(s) can execute other types and numbers of instructions and perform other types and numbers of operations. The processor(s) 18 may comprise one or more central processing units ("CPUs") or general purpose processors with one or more processing cores, such as AMD® processor(s), although other types of processor(s) could be used (e.g., Intel®).

Figure 2:
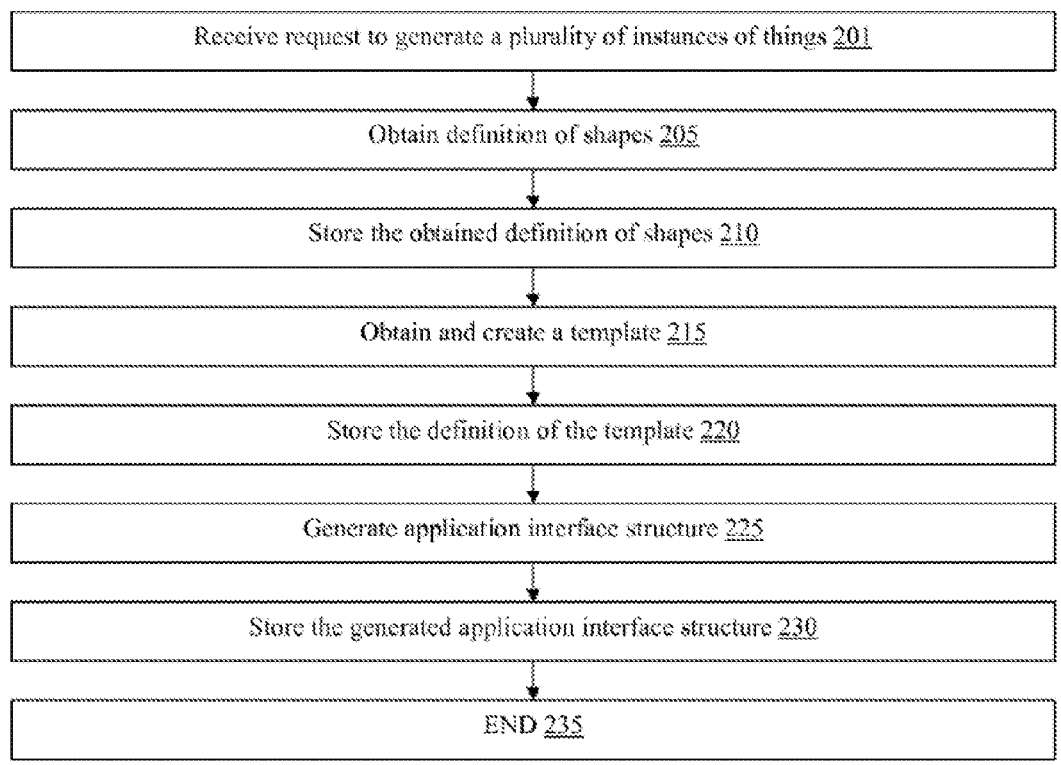
FIG. 2 is a flowchart of an exemplary method for dynamically generating one or more of a plurality of instances of things.
Figure 3:
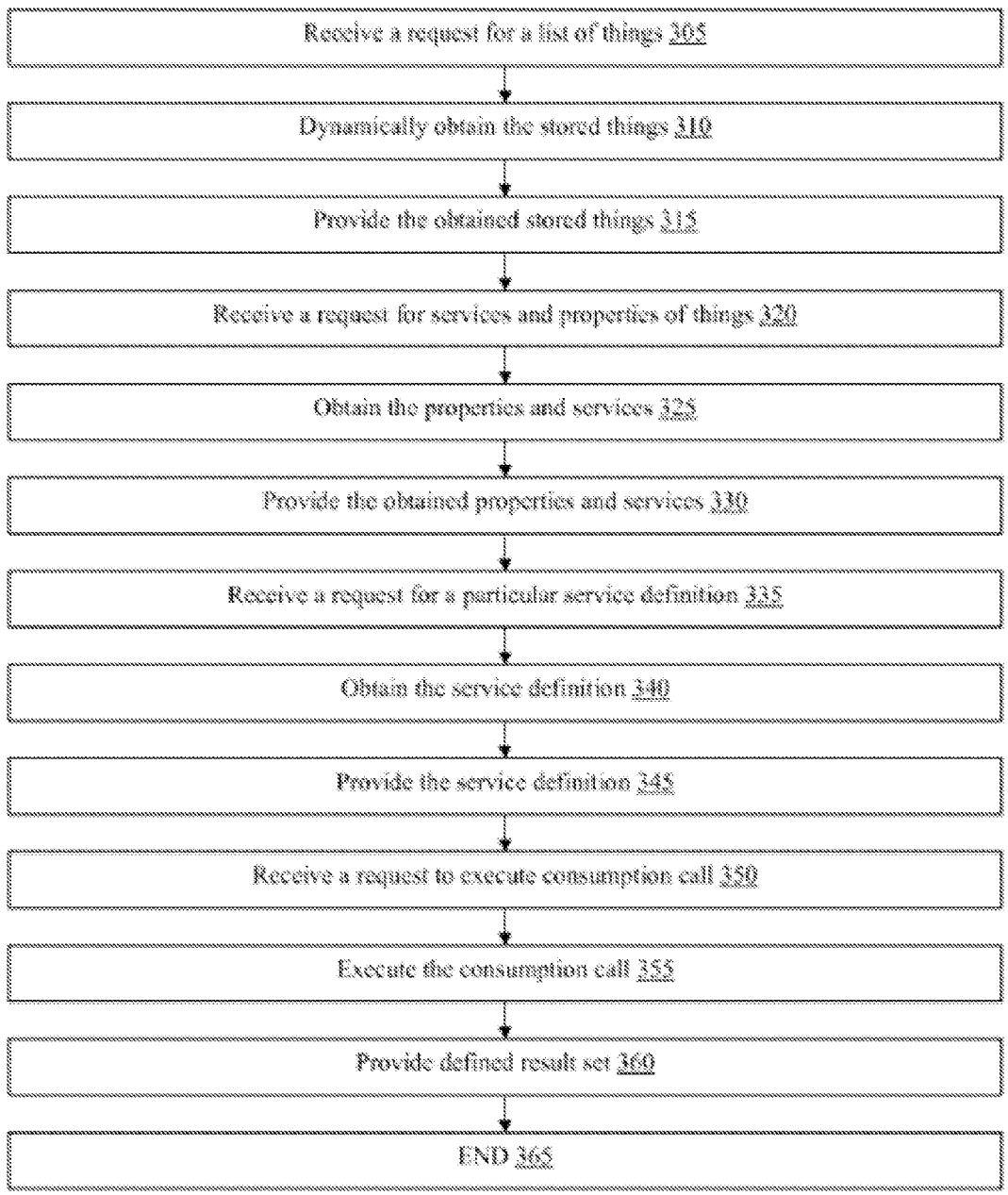
FIG. 3 is a flowchart of an exemplary method for generating and providing through an interface a dynamic representational state of a thing.

Memory 20 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. Memory 20 may store one or more non-transitory computer-readable instructions of this technology as illustrated and described with reference to the examples herein that may be executed by the one or more processor(s) 18. The flow chart shown in FIGS. 2 and 3 is representative of example steps or actions of this technology that may be embodied or expressed as one or more non-transitory computer or machine readable instructions stored in memory 20 that may be executed by the processor(s) 18.

Input and display devices 22 enable a user, such as an administrator, to interact with the data management computing apparatus 14, such as to input and/or view data and/or to configure, program and/or operate it by way of example only. Input devices may include a touch screen, keyboard and/or a computer mouse and display devices may include a computer monitor, although other types and numbers of input devices and display devices could be used. Additionally, the input and display devices 22 can be used by the user, such as an administrator to develop applications using an application interface.

The interface device 24 in the data management computing apparatus 14 is used to operatively couple and communicate between the data management computing apparatus 14, the client computing device 12, and the plurality of data servers which are all coupled together by LAN 28 and WAN 30. By way of example only, the interface device 24 can use TCP/IP over Ethernet and industry-standard protocols, including NFS, CIFS, SOAP, XML, LDAP, and SNMP although other types and numbers of communication protocols can be used.

Each of the consumer computing devices 12 includes a central processing unit (CPU) or processor, a memory, an interface device, and an I/O system, which are coupled together by a bus or other link, although other numbers and types of network devices could be used. Each of the consumer computing devices 12 communicates with the data management computing apparatus 14 through LAN 28, although the consumer computing devices 12 can interact with the data management computing apparatus 14 by any other means. The consumer computing device 12 utilizes the dynamically generated interface provided by the data management computing apparatus 14 to access modeled data and other information from one or more data servers 16.

Each of the plurality of data servers 16 includes a central processing unit (CPU) or processor, a memory, an interface device, and an I/O system, which are coupled together by a bus or other link, although other numbers and types of network devices could be used. Each of the plurality of data servers 16 enters, updates and/or store content, such as files and directories, although other numbers and types of functions can be implemented and other types and amounts of data could be entered, updated, or stored used. Each of the plurality of data servers 16 may include by way of example only, enterprise resource planning (ERP) systems, portals and related technologies, traditional business intelligence systems and manufacturing intelligence systems.

Although an exemplary environment 10 with the consumer computing devices 12, the data management computing apparatus 14 and the plurality of data servers 16 are described and illustrated herein, other types and numbers of systems, devices in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, 3G traffic networks, Public Switched Telephone Network (PSTNs), Packet Data Networks (PDNs), the Internet, intranets, and combinations thereof.

EXAMPLES

As an example, to build a monitoring and management application for a fleet of delivery trucks, you need to model the trucks. Let's assume each truck has the following attributes: Assigned Driver, Location, and Delivery Schedule. It has the following services: Change Driver, Update Location, Modify Schedule, List Schedule, and Get Schedule Execution Details.

A refrigerated truck Thing Shape is defined that has the following attributes: Temperature; Ambient Temperature; Compressor Run Hours; and Next Scheduled Compressor Maintenance Date. Now define a Thing Template that implements both the Truck Thing Shape and the refrigerated truck Thing Shape. Now you can define instances of all your refrigerated trucks using this Thing Template.

All entities defined are available for inspection through REST interfaces. All services defined can be consumed through REST interfaces for each defined truck. All truck data properties can be set/get through REST interfaces. No programming is required to have the REST interfaces enabled, it is all dynamically available through the platform described by this technology. If a change to a service at the ThingShape is made, all truck instances immediately and automatically reflect that change, and all changes are reflected in the REST interfaces.

Figure 1B:
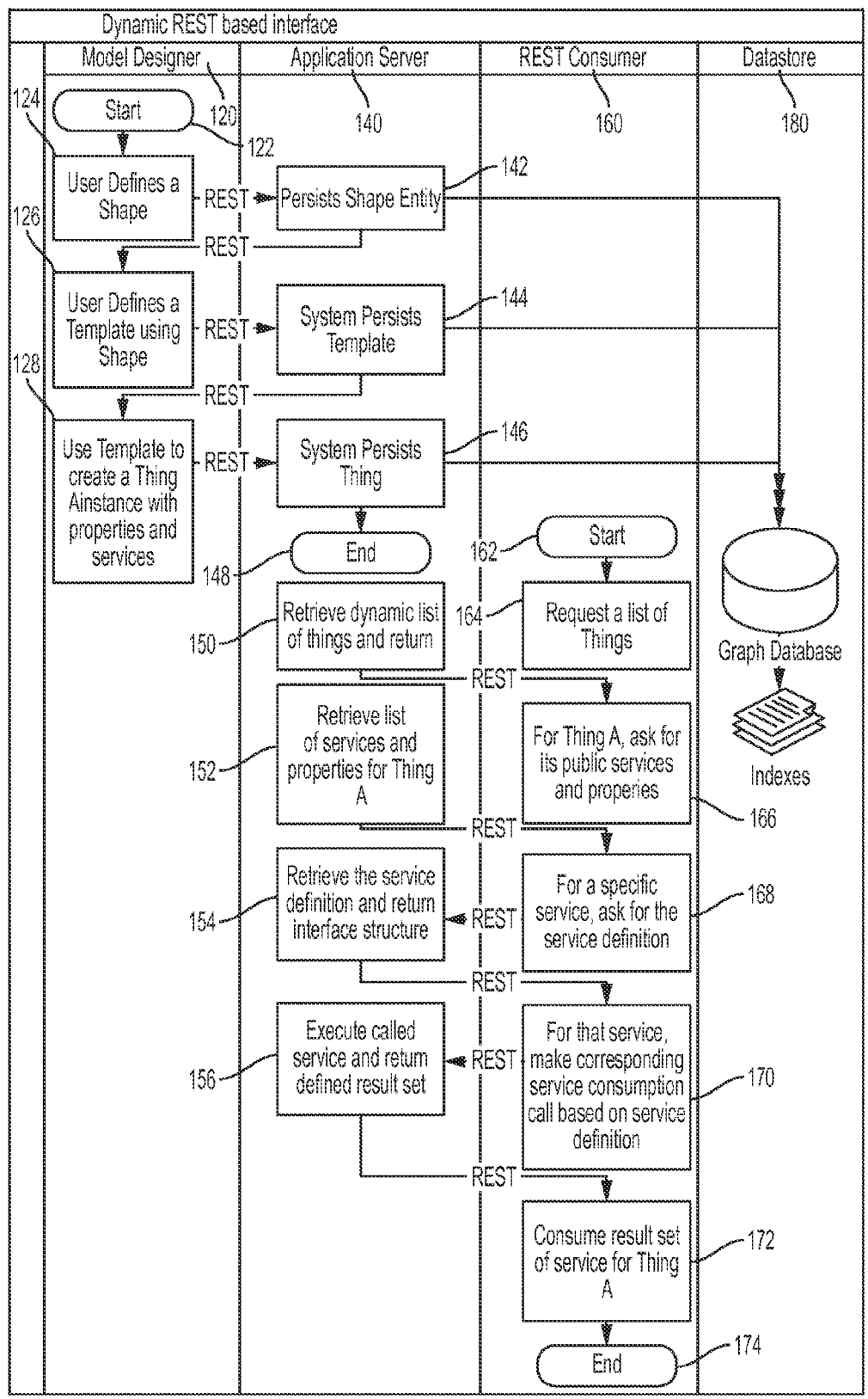
FIG. 1B is a flowchart of a method for dynamically generating a Representational State Transfer (REST) interface while creating a computer model of one or more entitites.

Referring now to FIG. 1B, an exemplary functional diagram which illustrates dynamically generating a REST interface during networked system modeling activity in accordance with embodiments of the present invention is illustrated. In this particular example, a model designer 120, which can be a human or another computer device, defines a model of another entity via a REpresentational State Transfer (REST) interface on an application server 140. The model contains a hierarchical representation of the system being modeled. The base component of the model is one or a plurality of "Shapes" 142. Shapes expose certain capabilities of the entity being modeled such as properties, services, events and subscriptions. One or more Shapes are then combined to form a Template 144 which inherits all of the characteristics of each Shape it implements. As each of these entities is created, they are persisted in a non-volatile data store 180 which also tags the model information with relational data regarding this particular entity and how it relates to the other entities in the model. The resulting Template is a non-specific, noninstantiated software representation of the entity being modeled. To instantiate a specific instance of the model the user creates a "Thing" 146 whose entity specific information is stored in either or both of a volatile or non-volatile data store and is also tagged with the appropriate model relationship information.

As the model is developed or altered in the future, the information regarding both the structure of the model and any Thing specific runtime information are made accessible via a Web Services interface provided by the Application Server 140. In this particular example, a web service consumer 160, which can be a plurality of humans, applications, devices, or other computer systems, requests information regarding the model using the dynamically generated REST interface, in this example the request is for a list of Things 164. Upon receiving the request, the Application Server queries the data store and returns the complete list of instantiated Things 150. The web service consumer is then able to query the application server for a list of a specific Thing's characteristics 166 as defined and tagged during the modeling phase. Application Server queries the data store for the relevant list of services and returns those services along with their interface structure 152.

Continuing this example, the web service consumer than requests more detailed information regarding a specific service 168. The Application Server retrieves this information from the data store and returns the service's interface structure 154. At this point the web service consumer now has enough information to invoke the service for that Thing instance 170, and consume the result set 172 provided by the application server.

The unique and innovative aspect of this approach is that the model composer did not have to explicitly create the web service interface. Purely through the action of creating the model, the appropriate REST interfaces were generated and made accessible to the consumer of the web service.

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An exemplary method for dynamically generating one or more of a plurality of instances of things will now be described with reference to FIGS. 1A-2. In step 201, the data management computing apparatus 14 receives a request to generate one or more of a plurality of instances of things from a consumer computing device 12, although this process can be initiated in other manners, such as by the data management computing apparatus 14.

Next, in step 205 the data management computing apparatus 14 obtains a defined shape for a modeled entity which is referred to in this patent application as a thing, from the requesting consumer computing device 12, although the data management computing apparatus 14 may obtain the defined shape from other sources, such as from one of the plurality of data servers 16 by way of example only. In these examples, a thing refers to people, apparatuses, systems, electronic or mechanical devices, components or other elements which are projections of real world equivalents containing sets of data, services, events, historical activities, collaboration, relationships and user interfaces that define it and its place in the real world. Additionally, in these examples shape refers to attributes of the thing which is being generated, such as events, service definitions, or services and subscriptions offered by the thing.

In step 210, the data management computing apparatus 14 stores the obtained defined shapes for the thing in memory 20 in one or more graph databases and indexes, although the data management computing apparatus 14 can store the obtained defined shapes for the thing at a different memory location, such as at one of the plurality of data servers 16 by way of example only. Additionally, in this technology, the data management computing apparatus 14 assigns tags to the obtained defined shape of the thing while storing the obtained defined shape and further stores the assigned tag and the exact memory location in the indexes present within the memory 20. By assigning tags and storing the obtained definition in the memory 20 and by using the indexes, the technology illustrated in this application provides rapid retrieval of the stored information In step 215, the data management computing apparatus 14 obtains a defined template from the requesting consumer computing device 12, although the data management computing apparatus 14 can obtain the defined template from other sources, such as from one of the plurality of data servers 16.

In step 220, the data management computing apparatus 14 stores the defined template using techniques as illustrated in step 210.

In step 225, the data management computing apparatus 14 generates an application interface structure for the instance of the thing based on the defined shape, the defined template and the properties and services of the thing. The generated application interface structure for the thing also includes service definitions which can be obtained from one or more of the plurality of data servers 16, although the generated application interface can include other types and amounts of information relating to the thing.

In step 230, the data management computing apparatus 14 stores the instance of the thing with the generated application interface structure, the service definitions, list of all properties and services offered by the thing, the defined shape and the defined template. This exemplary method can be repeated to generate additional instance of things in the exemplary manner described herein and then ends in step 235. By following the above exemplary steps to generate an application interface structure, this technology assists developers to build and deploy operational interface structures which are more dynamic and easier to use and navigate in less time than was possible with prior approaches.

An exemplary method for generating and providing through an interface a dynamic representational state of a thing will now be described with reference to FIGS. 1 and 3. In step 305 the data management computing apparatus 14 receives a request from a consumer computing device 12 for a list of things, although the data management computing apparatus 14 can receive any other types and numbers of requests from the consumer computing device 12. Next, in step 310 the data management computing apparatus 14 obtains the list of things from memory 20, although data management computing apparatus 14 can obtain the list of things from other sources and in other manners. Next, in step 315 the data management computing apparatus 14 provides the obtained list of things to the requesting consumer computing device 12.

In step 320, the data management computing apparatus 14 receives another request from the consumer computing device 12 for the services and properties of the previously requested thing based on a selection of the one thing instances from the previously provided list. Next, in step 325, the data management computing apparatus 14 obtains the properties and services associated with the requested thing from the stored instance of the thing in memory 20, although the properties and services associated with the requested thing could be obtained from other sources in other manners. Next, in step 330, the data management computing apparatus 14 provides the obtained properties and services associated with the requested thing to the requesting consumer computing device 12.

In step 335, the data management computing apparatus 14 receives another request from the consumer computing device 12 for a particular service definition for one of the previously provided services in the instance of the thing associated with the requested thing. Next, in step 340, the data management computing apparatus 14 obtains the service definition for the requested service from memory 20, although the service definition could be obtained from other sources in other manners. Next, in step 345 the data management computing apparatus 14 provides the service definition to the requesting consumer computing device 12 using techniques illustrated in step 310.

In step 350, the data management computing apparatus 14 receives a request to execute a consumption call for the thing relating to the previously provided service definition from the consumer computing device 12. Next, in step 355 the data management computing apparatus 14 executes the requested consumption call for the service definition associated with a service of the requested thing, although other types and numbers of functions could be executed.

In step 360, upon executing the consumption call, the data management computing apparatus 14 provides the defined result set for the executed consumption call in the dynamically generated interface structure associated with the requested one of the plurality of instances of things to the requesting one of the consumer computing device 12. Next, the steps above can be repeated again in response to another request, otherwise this exemplary method ends in step 365.

Accordingly, as illustrated and described with the examples herein this technology provides methods, non-transitory computer readable medium and apparatuses that more easily and effectively generate and provide through an interface a dynamic representational state of a thing. With this technology all of the interrelationships which exist in the dynamic representational state information are easily and readily available. Additionally, with this technology no specialized training is required.

Having thus described the basic concept of this technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of this technology. Additionally, the recited order of processing elements or sequences, or the use of numbers, letters, or other designations therefore, is not intended to limit the claimed processes to any order except as may be specified in the claims. Accordingly, this technology is limited only by the following claims and equivalents thereto.

What is claimed is:

1. A method for generating a dynamic representational state of a thing, the method comprising:
   generating by a data management computing apparatus a plurality of instances of things, each of the instances of things comprising a dynamically generated interface structure and one or more services associated with and one or more properties of the corresponding one of the things;
   retrieving and providing by the data management computing apparatus the one or more services associated with and the one or more properties of one of the plurality of instances of things for a selected one of the plurality of instances of things;
   retrieving and providing by the data management computing apparatus a service definition for a selected one of the one or more services based on the retrieved and provided one or more services associated with and one or more properties for the selected one of the plurality of instances of things;
   executing by the data management computing apparatus a requested consumption call for the selected one of the services based on the retrieved service definition; and
   providing by the data management computing apparatus a defined result set for the executed consumption call in the dynamically generated interface structure associated with the requested one of the plurality of instances of things.

2. The method as set forth in claim 1 further comprising:
   providing by the data management computing apparatus a list of the generated a plurality of instances of things; and
   receiving by the data management computing apparatus the selection of the one of the generated plurality of instances of things.

3. The method as set forth in claim 1 wherein the generating a plurality of instances of things further comprises:
   receiving by the data management computing apparatus the one or more services and the one or more properties associated with each of the generated plurality of instances of things; and
   persisting by the data management computing apparatus each of the generated plurality of instances of things with the corresponding received one or more services and the one or more properties.

4. The method as set forth in claim 3 wherein the generating a plurality of instances of things further comprises:
   receiving by the data management computing apparatus a defined shape for each of the generated plurality of instances of things;
   receiving by the data management computing apparatus a defined template for each of the generated plurality of instances of things for each of the generated plurality of instances of things;
   generating by the data management computing apparatus the dynamically generated interface structure based on the received defined shape, the received defined template and the received one or more properties for each of the generated plurality of instances of things; and
   persisting by the data management computing apparatus the dynamically generated interface structure for each of the generated plurality of instances of things.

5. A non-transitory computer readable medium having stored thereon instructions for generating a dynamic representational state of a thing comprising machine executable code which when executed by at least one processor, causes the processor to perform steps comprising:
   generating a plurality of instances of things, each of the instances of things comprising a dynamically generated interface structure and one or more services associated with and one or more properties of the corresponding one of the things;
   retrieving and providing the one or more services associated with and the one or more properties of one of the plurality of instances of things for a selected one of the plurality of instances of things;
   retrieving and providing a service definition for a selected one of the one or more services based on the retrieved and provided one or more services associated with and one or more properties for the selected one of the plurality of instances of things;
   executing a requested consumption call for the selected one of the services based on the retrieved service definition; and
   providing a defined result set for the executed consumption call in the dynamically generated interface structure associated with the requested one of the plurality of instances of things.

6. The medium as set forth in claim 5 further comprising:
providing a list of the generated a plurality of instances of things; and
receiving the selection of the one of the generated plurality of instances of things.

7. The medium as set forth in claim 5 wherein the generating a plurality of instances of things further comprises:
receiving the one or more services and the one or more properties associated with each of the generated plurality of instances of things; and
persisting each of the generated plurality of instances of things with the corresponding received one or more services and the one or more properties.

8. The medium as set forth in claim 7 wherein the generating a plurality of instances of things further comprises:
receiving a defined shape for each of the generated plurality of instances of things;
receiving a defined template for each of the generated plurality of instances of things for each of the generated plurality of instances of things;
generating the dynamically generated interface structure based on the received defined shape, the received defined template and the received one or more properties for each of the generated plurality of instances of things; and
persisting the dynamically generated interface structure for each of the generated plurality of instances of things.

9. A data management computing apparatus comprising:
one or more processors;
a memory coupled to the one or more processors which are configured to execute programmed instructions stored in the memory comprising:
generating a plurality of instances of things, each of the instances of things comprising a dynamically generated interface structure and one or more services associated with and one or more properties of the corresponding one of the things;
retrieving and providing the one or more services associated with and the one or more properties of one of the plurality of instances of things for a selected one of the plurality of instances of things;
retrieving and providing a service definition for a selected one of the one or more services based on the retrieved and provided one or more services associated with and one or more properties for the selected one of the plurality of instances of things;
executing a requested consumption call for the selected one of the services based on the retrieved service definition; and
providing a defined result set for the executed consumption call in the dynamically generated interface structure associated with the requested one of the plurality of instances of things.

10. The apparatus as set forth in claim 9 wherein the one or more processors is further configured to execute programmed instructions stored in the memory further comprising:
providing a list of the generated a plurality of instances of things; and
receiving the selection of the one of the generated plurality of instances of things.

11. The apparatus as set forth in claim 9 wherein the one or more processors is further configured to execute programmed instructions stored in the memory for the generating a plurality of instances of things further comprising:
receiving the one or more services and the one or more properties associated with each of the generated plurality of instances of things; and
persisting each of the generated plurality of instances of things with the corresponding received one or more services and the one or more properties.

12. The apparatus as set forth in claim 11 wherein the one or more processors is further configured to execute programmed instructions stored in the memory for the generating a plurality of instances of things further comprising:
receiving a defined shape for each of the generated plurality of instances of things;
receiving a defined template for each of the generated plurality of instances of things for each of the generated plurality of instances of things;
generating the dynamically generated interface structure based on the received defined shape, the received defined template and the received one or more properties for each of the generated plurality of instances of things; and
persisting the dynamically generated interface structure for each of the generated plurality of instances of things.

* * * * *